US006198943B1

(12) United States Patent
Sadler et al.

(10) Patent No.: US 6,198,943 B1
(45) Date of Patent: Mar. 6, 2001

(54) PARASITIC DUAL BAND MATCHING OF AN INTERNAL LOOPED DIPOLE ANTENNA

(75) Inventors: Robert A. Sadler, Durham; Gerard Hayes, Wake Forest, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/313,044

(22) Filed: May 17, 1999

(51) Int. Cl.[7] .............................. H04B 1/38; H04M 1/00; H01Q 1/24

(52) U.S. Cl. ........................... 455/553; 455/129; 343/702

(58) Field of Search .............................. 455/90, 129, 575, 455/552, 553; 343/742, 702, 866, 867

(56) References Cited

U.S. PATENT DOCUMENTS 5,854,970 * 12/1998 Kivela .................................... 455/90
5,923,305 * 7/1999 Sadler et al. ......................... 343/702
6,011,519 * 12/1998 Sadler et al. ......................... 343/702

* cited by examiner

*Primary Examiner*—Nguyen Vo
(74) *Attorney, Agent, or Firm*—Coats & Bennett, PLLC

(57) ABSTRACT

An internal, loop dipole antenna for a mobile terminal is capable of operating in two distinct RF bands. The antenna includes a resonating element and a parasitic tuning element. The resonating element has a looped, dipole configuration including a primary tuning loop, a secondary tuning loop, and a ground loop. The parasitic tuning element is disposed in a plane spaced from the plane of the resonating element. The parasitic element includes a first portion that generally follows the ground loop on the resonating element, and a second portion that bisects the primary tuning loop on the resonating element. First and second tuning arms extend along opposing ends of the parasitic tuning element. The length of the tuning arms is adjusted to tune the resonance of the antenna in the primary and secondary operating bands.

21 Claims, 5 Drawing Sheets

PARASITIC DUAL BAND MATCHING OF AN INTERNAL LOOPED DIPOLE ANTENNA

FIELD OF THE INVENTION

The present invention relates to mobile terminals for use in analog and digital-based cellular communication systems, and, in particular, to an improved antenna configuration for dual-band operation.

BACKGROUND OF THE INVENTION

Mobile terminals, and especially mobile telephones and headsets, are becoming increasingly smaller. These terminals require a radiating element or antenna for radio communications. Conventionally, antennas for such terminals are attached to and extend outwardly from the terminal's housing. These antennas are typically retractably mounted to the housing so that the antenna is not extending from the housing when the terminal is not in use. With the ever decreasing size of these terminals, the currently used external antennas become more obtrusive and unsightly, and most users find pulling the antenna out of the terminal housing for each operation undesirable. Furthermore, these external antennas are often subject to damage during manufacture, shipment and use. The external antennas also conflict with various mounting devices, recharging cradles, download mounts, and other cooperating accessories.

Application Ser. No. 09/189,890 describes an internal loop dipole antenna for a cellular telephone. The antenna includes extra traces and tuning elements on the same physical plane as the antenna element to enable dual-band operation. As phone designs become increasingly smaller and the antenna is brought closer to the ground plane (PCB) of the phone, the antenna begins to lose its effectiveness. It has been discovered that the effective bandwidth of the antenna is narrowed as the antenna is brought closer to the ground plane of the antenna. Also, tuning of the resonance frequencies becomes problematic due to the strays and parasitics caused by the antenna's close proximity to the ground plane. The extra traces and tuning elements did not provide sufficient bandwidth in both bands of operation. Also, lumped elements such as capacitors and inductors did not adequately eliminate the strays and parasitics.

Accordingly, there remains a need for a dual band antenna that will operate effectively in two distinct operating bands even when the antenna is brought in close proximity to the ground plane of the phone.

SUMMARY OF THE INVENTION

The present invention provides an internal antenna for mobile terminals that provides performance comparable with externally mounted antennas, even when placed in close proximity to the ground plane. The antenna includes a resonating element and a parasitic tuning element. The resonating element has a looped, dipole configuration including first and second tuning loops and a ground loop. The tuning loops and ground loop are electrically connected by tuning elements which, preferably, are in the same plane as the tuning loops and ground loop. The loops of the resonating elements may be placed around other components of the phone without significantly impinging on precious physical space. For example, the loops may be disposed around the keypad or display in the housing, in a flip portion pivotally connected to a main section of the housing, or in a distinct printed circuit board enclosed in the housing.

The parasitic element is disposed in a plane spaced from the plane of the resonating element. The parasitic element includes a first portion that generally follows the contour of the ground loop on the resonating element, and a second portion that bisects one of the tuning loops on the resonating element. First and second tuning arms extend along opposing ends of the parasitic tuning. The parasitic element is shifted in the x-y plane to tune the resonant frequency of the antenna to a first operating band. The length of the tuning arms is adjusted in order to tune the antenna to a second operating band.

An advantage of the present invention is that it allows the design engineer to match the antenna to a VSWR of approximately 2:1 in two distinct operating bands (typically the 900 MHz and 1800 MHz bands) even at the band edges. This allows the antenna to obtain broad bandwidth in both bands of operation and prevents loss of gain due to mismatch of the VSWR. No prior art antennas have been able to obtain these advantages in an antenna spaced in close proximity to the ground plane.

DETAILED DESCRIPTION OF THE INVENTION

Figure 1:
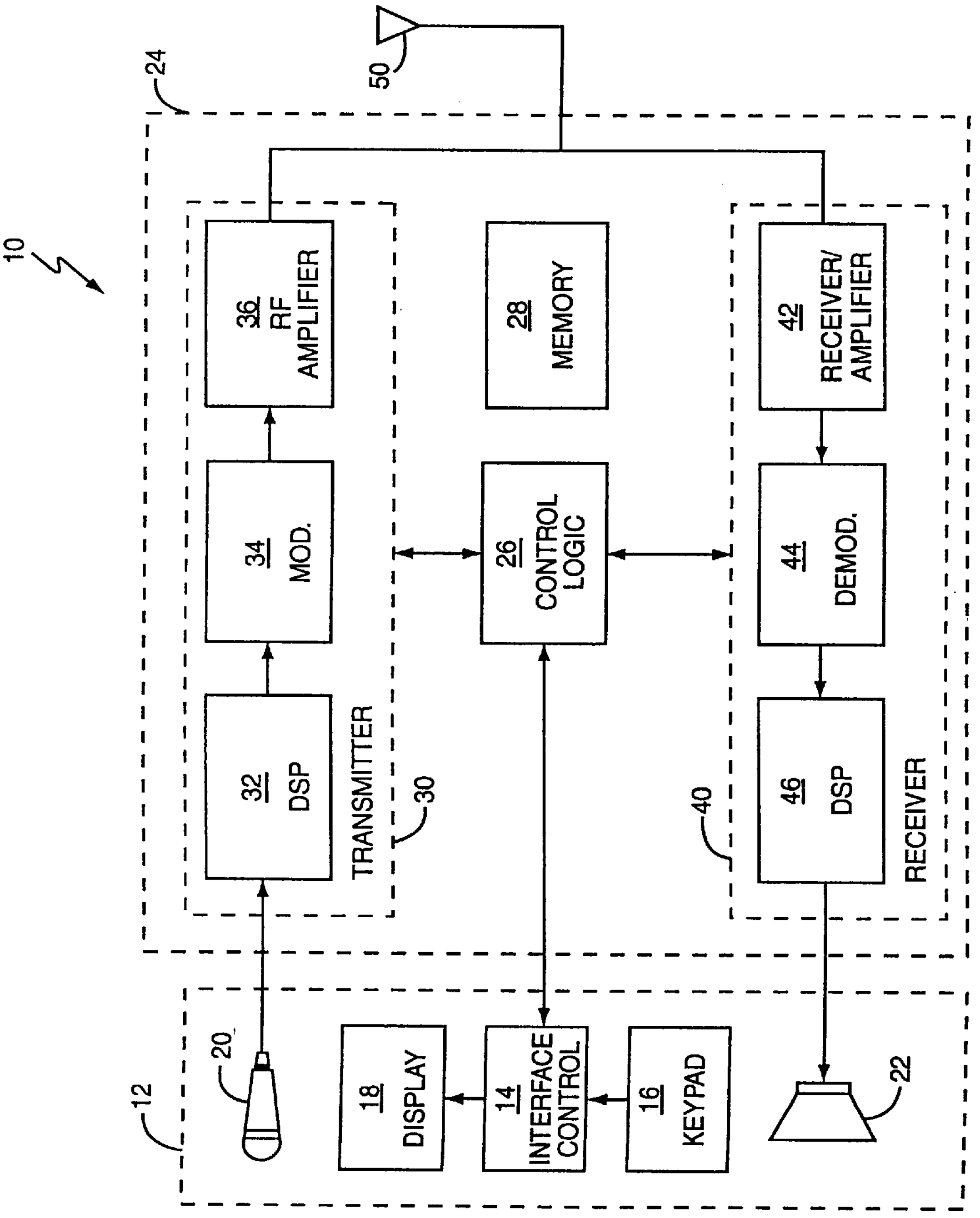
FIG. 1 is a functional block diagram of a cellular telephone constructed in accordance with the present invention.
Figure 2:
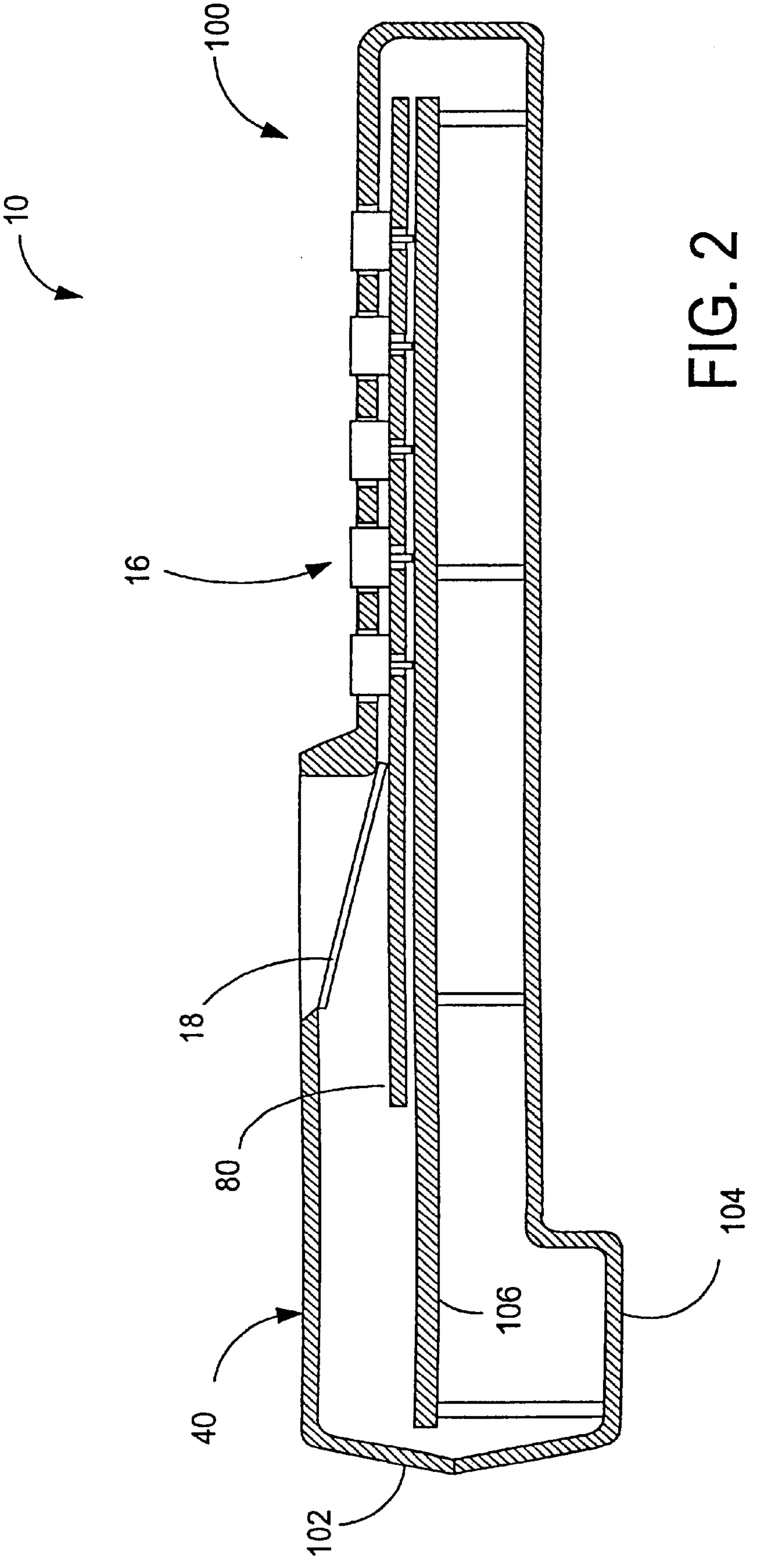
FIG. 2 is a section view of the cellular telephone showing the printed circuit board and antenna insert.

Referring now to the drawings, and particularly to FIGS. 1 and 2, a mobile communication device, such as a cellular telephone, is shown and indicated generally by the numeral 10. Mobile telephone 10 is a fully functional radio transceiver capable of transmitting and receiving digital and/or analog signals over an RF channel according to known standards, such as Telecommunications Industry Association (TIA), IS-54, and IS-136. The present invention, however, is not limited to cellular telephones, but may also be implemented in other types of communication devices including, without limitation, pagers and personal digital assistants.

The mobile telephone 10 includes an operator interface 12 and a transceiver unit 24 contained in a housing 100. Users can dial and receive status information from the mobile telephone 10 via the operator interface 12. The operator interface 12 consists of a keypad 16, display 18, microphone 20, and speaker 22. The keypad 16 allows the user to dial numbers, enter data, respond to prompts, and otherwise control the operation of the mobile telephone 10. The display 18 allows the operator to see dialed digits, call status information, messages, and other stored information. An interface control 14 interfaces the keypad 16 and display 18 with the telephone's control logic 26. The microphone 20 and speaker 22 provide an audio interface that allows users to talk and listen on their mobile telephone 10. Microphone 20 converts the user's speech and other sounds into audio signals for subsequent transmission by the mobile telephone 10. Speaker 22 converts audio signals received by the mobile telephone 10 into audible sounds that can be heard by the user. In general, the microphone 20 and speaker 22 are contained in the housing of the mobile telephone 10. However, the microphone 20 and speaker 22 can also be located in a headset that can be worn by the user.

The transceiver unit 24 comprises a transmitter 30, receiver 40, and antenna assembly 50. The transceiver circuitry is typically contained on a printed circuit board 106 disposed in the phone's housing 100. The transmitter 30 includes a digital signal processor 32, modulator 34, and RF amplifier 36. The digital signal processor 32 converts analog signals from the microphone 20 into digital signals, compresses the digital signal, and inserts error-detection, error-correction, and signaling information. Modulator 34 converts the signal to a form that is suitable for transmission on an RF carrier. The RF amplifier 36 amplifies the signal to a suitable power level for transmission. In general, the transmit power of the telephone 10 can be adjusted up and down in two decibel increments in response to commands it receives from its serving base station. This allows the mobile telephone to only transmit at the necessary power level to be received and reduces interference to nearby units.

The receiver includes a receiver/amplifier 42, demodulator 44, and digital signal processor 46. The receiver/amplifier 42 contains a band pass filter, low level RF amplifier, and mixer. Received signals are filtered to eliminate side bands. The remaining signals are sent to a low-level RF amplifier and routed to an RF mixer assembly. The mixer converts the frequency to a lower frequency that is either amplified or directly provided to the demodulator 44. The demodulator 44 extracts the transmitted bit sequence from the received signal. The digital signal processor 46 decodes the signal, corrects channel-induced distortion, and performs errordetection and correction. The digital signal processor 46 also separates control and signaling data from speech data. The control and signaling data are passed to the control logic 26. Speech data is processed by a speech decoder and converted into an analog signal which is applied to speaker 22 to generate audible signals that can be heard by the user.

The control logic 26 controls the operation of the telephone 10 according to instructions stored in a program memory 28. Control logic 26 may be implemented by one or more microprocessors. The functions performed by the control logic 26 include power control, channel selection, timing, as well as a host of other functions. The control logic 26 inserts signaling messages into the transmitted signals and extracts signaling messages from the received signals. Control logic 26 responds to any base station commands contained in the signaling messages and implements those commands. When the user enters commands via the keypad 16, the commands are transferred to the control logic 26 for action.

The antenna assembly 50 is operatively connected to the transmitter 30 and receiver 40 for radiating and receiving electromagnetic waves. Electrical signals from the transmitter 30 are applied to the antenna assembly 50 which converts the signal into electromagnetic waves that radiate out from the antenna 50. Conversely, when the antenna 50 is subjected to electromagnetic waves radiating through space, the electromagnetic waves are converted by the antenna 50 into an electrical signal that is applied to the receiver 40.

In a hand-held mobile telephone, the antenna assembly 50 is typically an integral part of the mobile telephone 10. Commonly, the antenna for a mobile telephone 10 comprises an external quarter-wavelength rod antenna. One purpose of the present invention is to eliminate this type of external rod antenna. Instead, the antenna 50 of the present invention is a loop dipole antenna that can be mounted internally in the housing 100 of the telephone 10 or integrated into the housing 100 itself.

Figure 3B:
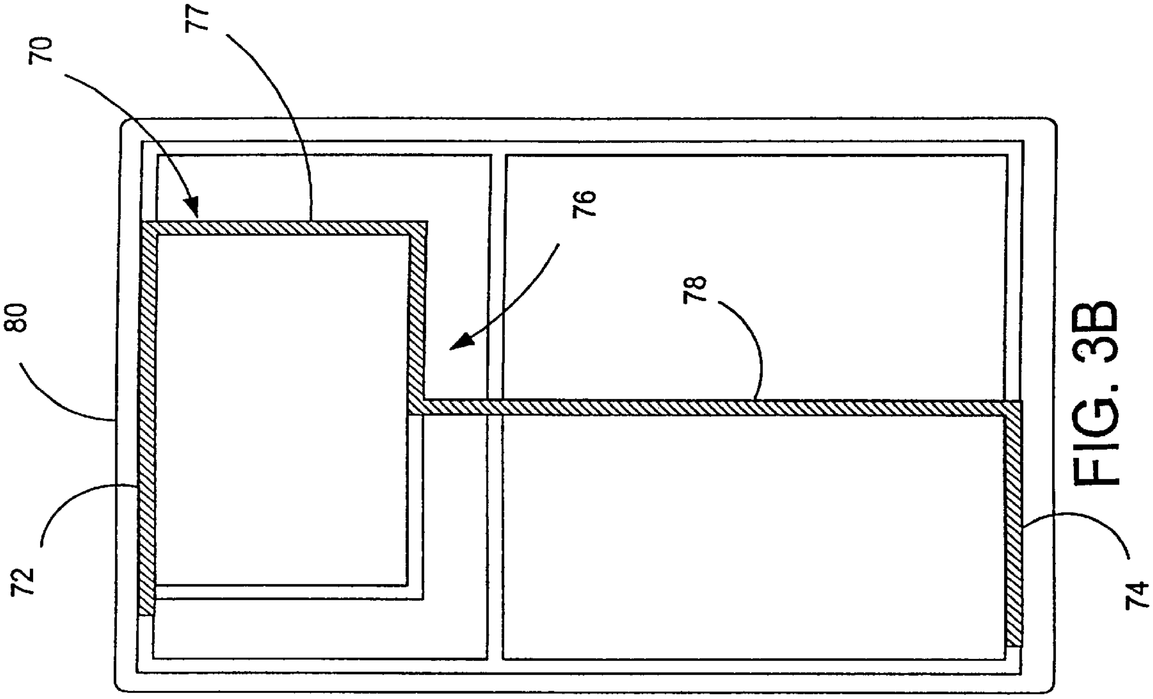
FIGS. 3A and 3B are top plan views of the antenna insert showing the parasitic tuning element superimposed over the resonating element.
Figure 3A:
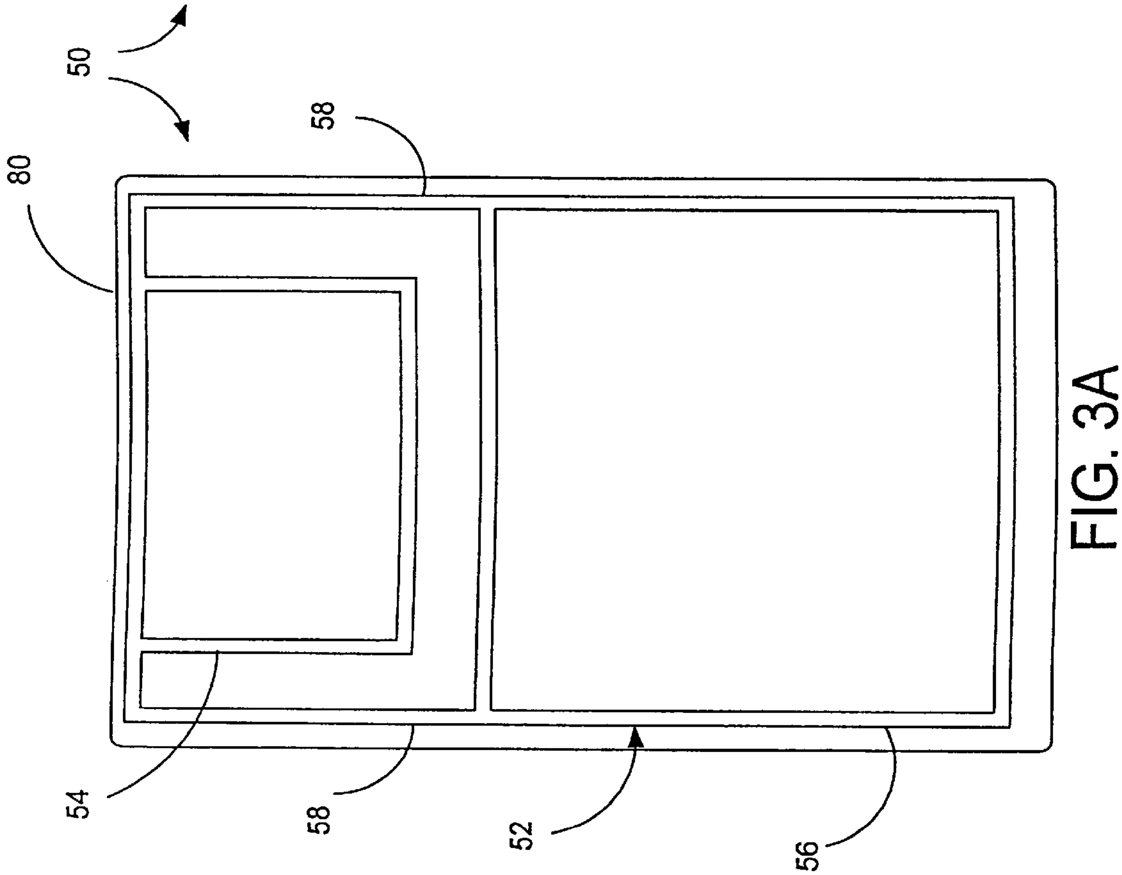

The antenna 50 of the present invention is shown in FIGS. 3A and 3B. The antenna includes two elements, referred to herein as the resonating element 52 and the parasitic tuning element 70. The resonating element 52 includes a ground loop 54 and a primary tuning loop 56 for a first RF band. The resonating element 52 also includes tuning elements 58 that join the ground loop 54 and primary tuning loop 56 to form a secondary tuning loop for a second RF band. A signal is fed to the antenna 50 by a transmission line. The ground of the transmission line is connected to the ground loop 54. The main conductor of the transmission line is connected to the primary loop 56. The primary tuning loop 56 and ground loop 54 are sized to provide a half-wave dipole antenna in a primary band of operation. In the disclosed embodiment, the primary operating band is the 1800 MHz band. The secondary tuning loop is sized so that the antenna 50 can also receive signals in a secondary RF band. In the disclosed embodiment, the secondary band is the 900 MHz band.

The parasitic tuning element 70 is spaced above the resonating element 52. The parasitic tuning element 70 includes a pair of tuning arms 72, 74 which are joined by a central connector 76. The central connector includes a first portion 77 that generally follows the outline of the ground loop 54 on the resonating element 52, and a second part 78 that bisects the primary tuning loop 56.

In one embodiment of the invention, the resonating element 52 and tuning element 70 are disposed on a first surface of a flat insert 80 made of a dielectric material as seen in FIGS. 3A and 3B. The insert 80 is disposed within the housing 100 so that the antenna 50 is less than 10 mm from the printed circuit board 106, and preferably less than 6 mm from the printed circuit board 106. The resonating element 52 may be photo-etched on the surface of the insert 80, then covered by a TEFLON® tape or other dielectric laminate material. The parasitic tuning element 70 is placed over the resonating element 52 with the laminate separating the two elements. The insert 80 with the antenna assembly 50 thereon can be mounted within the housing 100 of the mobile telephone with the insert 80 separating the resonating element 52 of the antenna from the printed circuit board inside the phone. The thickness of the insert or dielectric constant of the material can be varied as needed to increase or decrease the effective distance of the antenna from the ground plane (i.e., printed circuit board).

Figures 4A, 4B:
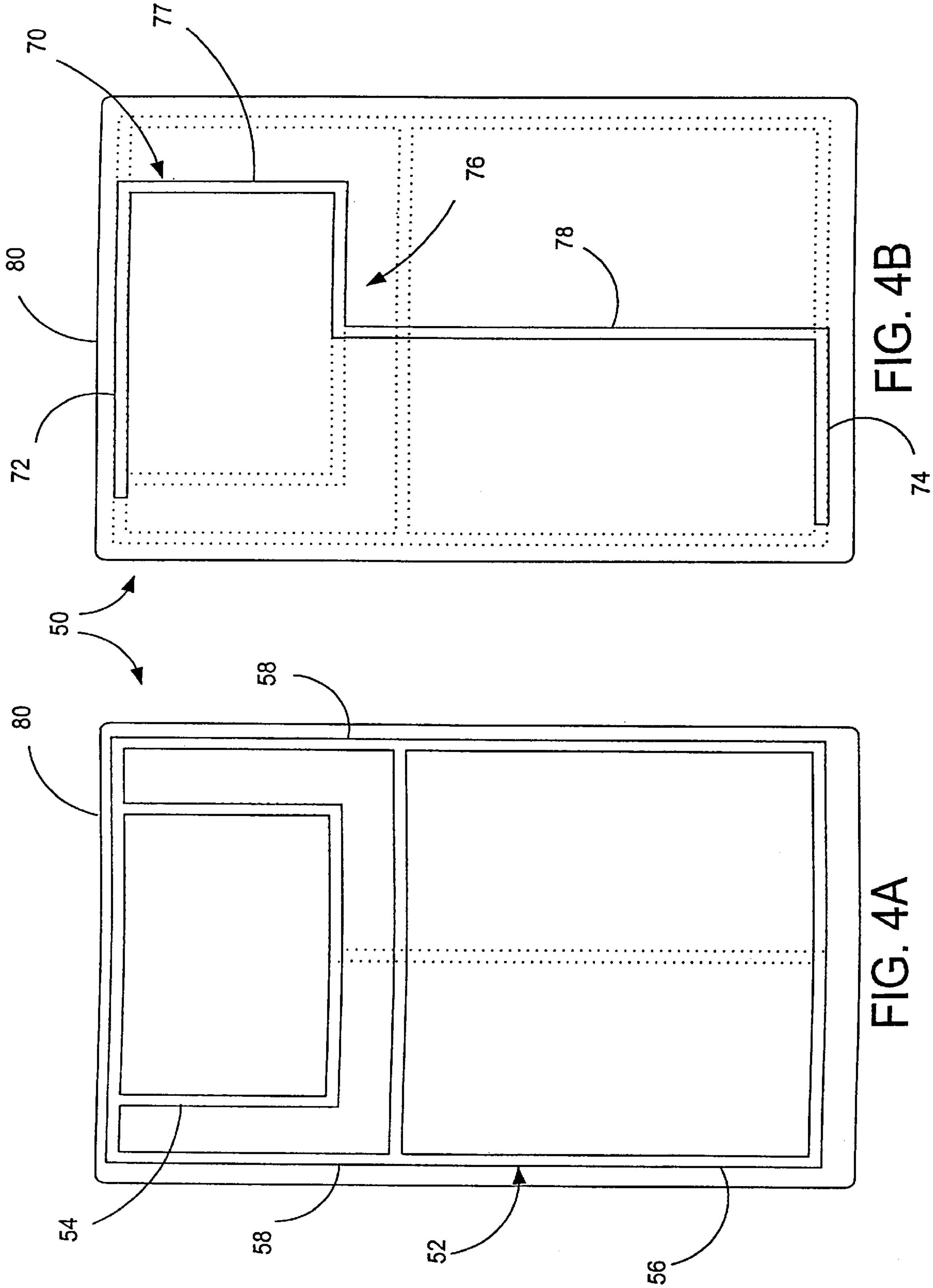
FIGS. 4A and 4B is a top plan view and bottom plan view respectively of an alternate embodiment of the antenna insert showing the parasitic tuning element and resonating element on opposing sides of the insert.
Figure 5B:
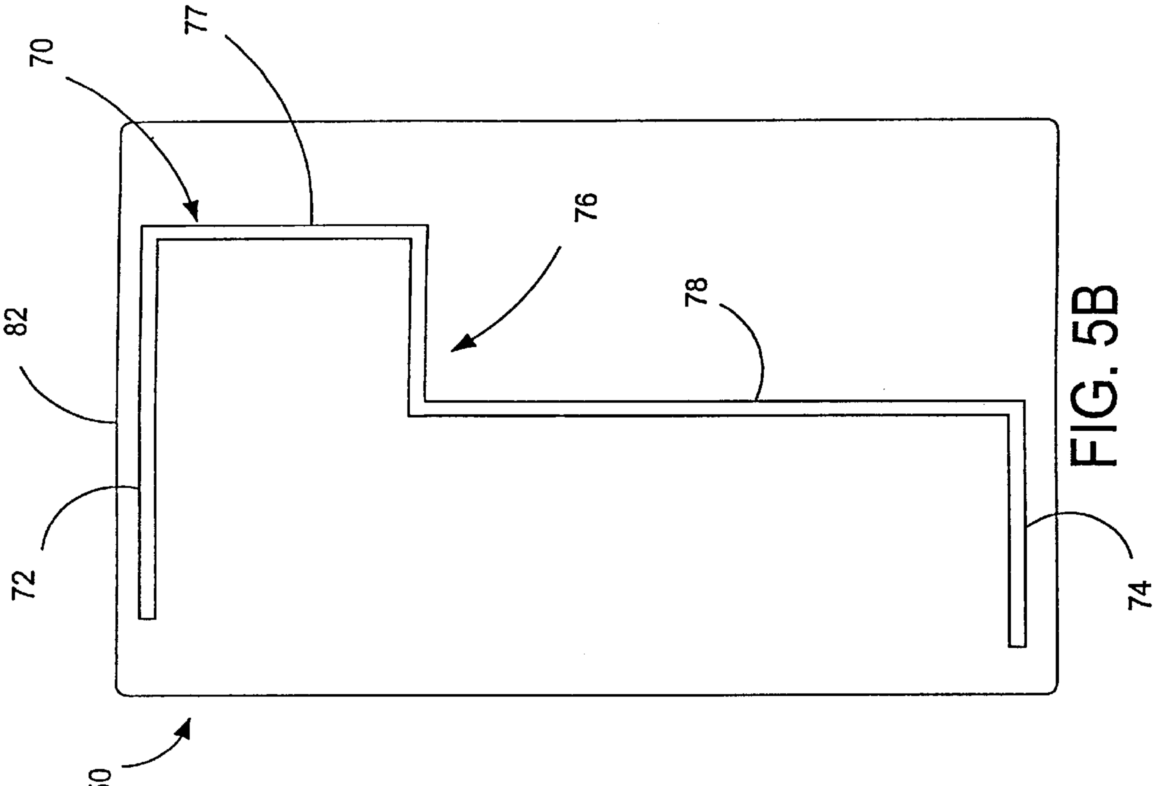
FIGS. 5A and 5B are top plan views showing two separate antenna inserts for the resonating element and tuning element respectively.
Figure 5A:
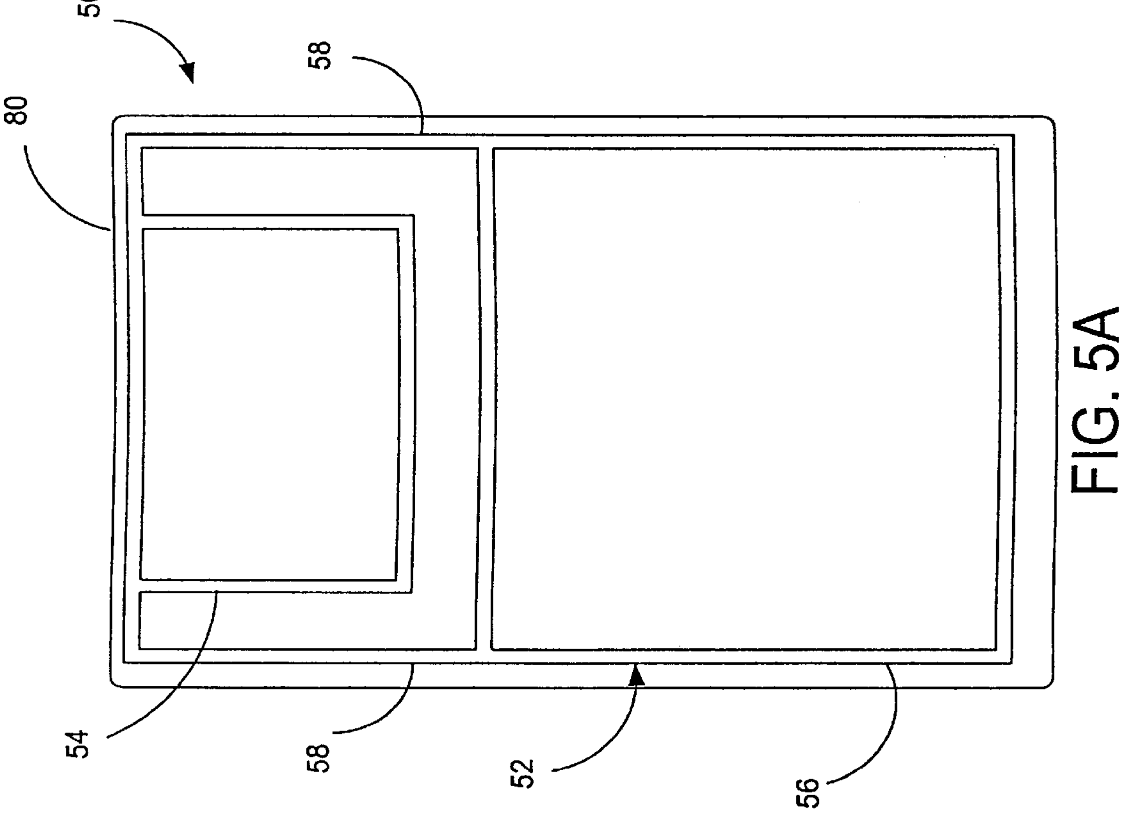

Those skilled in the art will recognize that other methods exist for constructing the antenna 50. For example, the resonating element 52 and tuning element 70 could both be photo-etched on opposing sides of the antenna insert 80, as shown in FIGS. 4A and 4B. The thickness or dielectric constant of the insert 80 could then be varied as needed for proper tuning. Another alternative would be to use separate inserts 80, 82 for the resonating element 52 and tuning element 70, respectively, as shown in FIGS. 5A and 5B. The tuning element 70 could also be photo-etched on the inside of the front cover 102 and covered with a TEFLON® tape or other dielectric laminate material. These examples are intended to illustrate some of the various methods that may be used to construct the antenna 50, and those skilled in the art will recognize that other equivalent methods may exist.

It has been found that the antenna 50 can be tuned for dual band operations. Ideally, the antenna should be tuned to obtain a voltage standing wave ratio (VSWR) of approximately 2:1 in both bands of operation. To find the proper location of the tuning element 70 with respect to the resonating element 52, the tuning element 70 is placed in an initial position and the VSWR is determined. The parasitic tuning element 70 is then shifted in the x-y plane (i.e., the plane in which the tuning element 70 lies) to center the primary band so that it is as close to the 2:1 ratio as possible. Once the tuning element 70 is properly positioned, the lengths of the tuning arms 72, 74 are adjusted to tune the antenna in both the primary and secondary band. It has been observed that adjusting the length of the tuning arm 72 affects the resonance primarily in the secondary band and secondarily in the primary band. Adjusting the length of tuning arm 74 has the opposite effect. The lengths of both tuning arms 72, 74 are adjusted as needed to obtain the best possible match, in both bands of operation, recognizing that it may not be possible to obtain an ideal match in either band.

The loop dipole antenna of the present invention enables the antenna to be tuned to two distinct operating bands, even when the antenna is placed in close proximity to the ground plane of the phone 10. Using the present invention, it is possible to obtain a VSWR of approximately 2:1 in both bands of operation. This prevents the loss of gain due to mismatch caused by poor bandwidth. Another advantage of the present invention is that it is less vulnerable to damage as compared to external antennas.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A loop dipole antenna for a mobile radio communication device capable of dual band operation, comprising:

a. a ground plane;

b. a resonating element disposed in a first plane spaced from said ground plane, said resonating element including a first tuning loop for tuning said antenna to transmit and receive signals in a first operating band and a ground loop, said first tuning loop and said ground loop being arranged in a looped dipole configuration; and c. a parasitic tuning element disposed in spaced relationship to said resonating element, said parasitic tuning element including first and second tuning arms interconnected by a central connecting member, wherein said central connecting member includes a first portion that generally follows the ground loop on the resonating element and a second portion that bisects said first tuning loop.

2. The loop dipole antenna according to claim 1 wherein the first tuning loop and said ground loop lie in a common plane.

3. The loop dipole antenna according to claim 1 further including a second tuning loop for tuning said antenna to transmit and receive signals in a second operating band.

4. The loop dipole antenna according to claim 3 wherein said second tuning loop lies in the same plane as said first tuning loop.

5. The loop dipole antenna according to claim 3 wherein said resonating element is spaced approximately 6mm or less from said ground plane.

6. The loop dipole antenna according to claim 1 wherein said antenna further includes a planar base member made of a dielectric material having the resonating element on one surface thereof.

7. The loop dipole antenna according to claim 6 wherein said parasitic tuning element is applied to a surface of said base member.

8. The loop dipole antenna according to claim 7 wherein said resonating element and said parasitic tuning element are both on the same surface of the base member separated by a dielectric layer.

9. The loop dipole antenna according to claim 7 said resonating element and said parasitic tuning element are on opposing surfaces of said base member.

10. The loop dipole antenna according to claim 6 wherein said parasitic element is applied to a surface of a housing of the communication device.

11. A loop dipole antenna for a mobile radio communication device capable of dual band operation, comprising:

a. a first tuning loop for transmitting and receiving signals in a primary band of operation;

b. a ground loop lying in the same plane as said first tuning loop, wherein said first tuning loop and said ground loop are arranged in a dipole configuration;

c. a parasitic tuning element disposed in a parallel plane to said first tuning loop and said ground loop, said parasitic tuning element including a first portion that generally follows said ground loop and a second portion that bisects said first tuning loop.

12. The loop dipole antenna according to claim 11 further including a second tuning loop for tuning said antenna to transmit and receive signals in a second operating band.

13. The loop dipole antenna according to claim 12 wherein said second tuning loop lies in the same plane as said first tuning loop.

14. The loop dipole antenna according to claim 13 further comprising a ground plane, wherein said first and second tuning loops are spaced approximately 6 mm or less from said ground plane.

15. The loop dipole antenna according to claim 11 wherein said parasitic tuning element further includes first and second tuning arms disposed at opposing ends of said parasitic tuning element.

16. A radio communication device comprising:

a. a housing;

b. a printed circuit board disposed in said housing containing radio communication electronics;

c. a loop dipole antenna electrically disposed in said housing in spaced relationship with said printed circuit board and coupled to said radio communication electronics, said antenna being arranged so that said printed circuit board functions as a ground plane for said antenna, said antenna including:

i. a resonating element including a first tuning loop for tuning said antenna to transmit and receive signals in a first operating band and a ground loop, said first tuning loop and said ground loop being arranged in a looped dipole configuration; and ii. a parasitic tuning element disposed in a parallel plane to said first tuning loop and said ground loop, said parasitic tuning element including a first portion that generally follows said ground loop and a second portion that bisects said first tuning loop.

17. The radio communication device according to claim 16 wherein said antenna further includes a planar base member made of a dielectric material having the resonating element on one surface thereof.

18. The radio communication device according to claim 17 wherein said parasitic tuning element is applied to a surface of said base member.

19. The radio communicating device according to claim 18 wherein said resonating element and said parasitic tuning element are both on the same surface of the base member with a dielectric separating material disposed between them.

20. The radio communicating device according to claim 18 said resonating element and said parasitic tuning element are on opposing surfaces of said base member.

21. The radio communication device according to claim 17 wherein said parasitic tuning element is applied to a surface of said housing.

* * * * *